United States Patent
Digabel

[19]

[11] Patent Number: 6,138,029
[45] Date of Patent: Oct. 24, 2000

[54] SMART CARD READER WITH A CLOCK SWITCH

[75] Inventor: Patrick Digabel, Mondeville, France

[73] Assignee: U.S. Philips Corporation, New York, N.Y.

[21] Appl. No.: 09/233,843

[22] Filed: Jan. 20, 1999

[30] Foreign Application Priority Data

Jan. 20, 1998 [FR] France .................................. 98 00563

[51] Int. Cl.7 ............................. H04B 7/005; H04B 1/38; H04M 1/00
[52] U.S. Cl. .......................... 455/502; 455/558; 455/343
[58] Field of Search .................................... 455/502, 343, 455/574, 38.3, 558; 375/356; 370/503; 331/25; 327/2

[56] References Cited

U.S. PATENT DOCUMENTS 5,680,076  10/1997  Kelkar et al. ............................... 331/25
5,943,613  8/1999   Wendelrup et al. ...................... 455/343

FOREIGN PATENT DOCUMENTS

0317068A2  5/1989  European Pat. Off. .......... G06F 1/04

Primary Examiner—Nguyen Vo
Attorney, Agent, or Firm—Dicran Halajian

[57] ABSTRACT

The present invention relates to a smart card reader including a connector (CON) of which one terminal is intended to deliver a clock signal (CLK) to an integrated circuit present on the card, a microcontroller (MC) intended to exchange data with the integrated circuit, an interface module (IM) comprising a first oscillator (OSC1) that generates a first clock signal (Clk1) and a second oscillator (OSC2) that generates a second clock signal (Clk2), the interface module (IM) further including a switching device (SW) controlled by the microcontroller (MC), which switching device transports either the first clock signal (Clk1) or the second clock signal (Clk2) to the clock terminal of the connector (CON). According to the invention, the switching device (SW) includes a phase detector (PD) which subjects any switching of the switching device (SW) to a simultaneity of the active edges of the first and second clock signals (Clk1) and (Clk2).

4 Claims, 4 Drawing Sheets

US 6,138,029

SMART CARD READER WITH A CLOCK SWITCH

FIELD OF THE INVENTION

The present invention relates to a smart card reader comprising:
- a connector intended to be electrically connected to an integrated circuit present on the surface of a smart card inserted into the reader, and of which at least one terminal, called clock terminal, is intended to deliver a clock signal to said integrated circuit,
- a microcontroller intended to exchange data with the integrated circuit and to manage its power supply and its operating frequency,
- an interface module inserted between the connector and the microcontroller, comprising a first oscillator, whose output is intended to deliver a first clock signal which has a transition frequency, the interface module further including a processing unit enabling data exchange between the microcontroller and the integrated circuit, and
- a second oscillator whose output is intended to deliver a second clock signal which has an operational frequency that is higher than the transition frequency,
- the interface module further including a switching device intended to transport either the first clock signal or the second clock signal to the clock terminal of the connector according to the value of a control signal received from the microcontroller.

BACKGROUND OF THE INVENTION

Smart card readers are currently used in devices intended to receive and/or transmit data, such as portable radiotelephones or television signal decoders. In such an application, the smart card contains data necessary for the operation of the device, for example, a code enabling to identify the user who has inserted the smart card into the reader, and the functions the device is authorized to carry out for this user. When a card is inserted into the reader, these two elements interact in two successive operating modes: in a first mode called initialization mode, the system is not yet operational. The reader is first to detect the presence of the smart card and then put the integrated circuit present on the surface of the smart card in its nominal operating conditions, that is to say, inter alia, supply a voltage thereto or initialize data paths so that the integrated circuit can communicate with the reader. In a second mode, called permanent mode, the integrated circuit is supplied with a voltage and receives a clock signal having the operational frequency, and the data paths are ready to transport data between the reader and the integrated circuit. During the initialization mode, the integrated circuit must receive a clock signal, having a frequency which may be different from the operational frequency. A signal having a frequency, called transition frequency, which is lower than the operational frequency, is preferably used which is lower than the operational frequency, which enables to reduce the energy consumption of the integrated circuit during the initialization mode. Such a choice is particularly advantageous in applications where the energy source used for supplying the integrated circuit with its supply voltage is a battery, as in portable radiotelephones. At the end of the initialization mode, the interface module is thus to switch the signal if provided to the clock terminal of the connector. This switching is realized by the switching device which, when it receives the order materialized by a certain value of the control signal, replaces the clock signal which formed the clock signal of the integrated circuit during the initialization mode, with the second clock signal intended to constitute the clock signal of the integrated circuit during the permanent mode.

The switching from one clock signal to another may in theory be carried out by means of a simple multiplexing controlled by the control signal. Such a multiplexing is asynchronous. If the first and second clock signals are in the inactive and the active state respectively, the moment when the clock signal orders the switching from the one to the other, said switching will cause the appearance of an unwanted active edge in the signal transmitted to the clock terminal, which unwanted edge will neither have been generated by the first nor by the second clock signal. Such an unwanted active edge may be harmful to the operation of the integrated circuit. To prevent this drawback, two authorization signals, each associated to one of the clock signals, may be generated and stored inside memory flip-flops, the clock signal selected by means of the control signal then only being transported to the clock terminal if its associated authorization signal is in the active state. The switching from one clock signal to the other is then to be effected in two periods: in a first period, the memory flip-flop in which the authorization signal associated to the first clock signal is stored is invalidated, that is to say, it receives an active signal on a reset-to-zero input, which thwarts the transport of the second clock signal to the clock terminal, after which, in a second period, the memory flip-flop in which the authorization signal associated to the second clock signal is stored is validated, that is to say, it receives an inactive signal on its reset-to-zero input which enables the transport of the second clock signal to the clock terminal. If such a mode of operation enables to prevent unwanted edges from occurring in the signal transmitted to the clock terminal, another disadvantage shows up, however. Because two steps are necessary for the invalidation of the flip-flop that is active before the switching, and for the validation of the flip-flop that must be active after the switching, a wanted active edge of the second clock signal, appearing immediately after the selection of said signal has been ordered by the control signal, may be ignored during the switching process, which may also be disadvantageous to the operation of the integrated circuit.

It is an object of the present invention to remedy the drawbacks described above by proposing a smart card reader in which the switching circuit is arranged so that the switching from one clock signal to the other takes place in a single step without, however, enabling unwanted active edges to occur in the signal transmitted to the clock terminal.

SUMMARY OF THE INVENTION

Indeed, a smart card reader in accordance with the opening paragraph is characterized according to the invention in that the switching device of the interface module includes a phase detector which has an output intended to deliver a signal that adopts an active state when the first and the second clock signal feature quasi-simultaneous active edges, the taking into account of the control signal by the switching device being conditioned by said active state.

The phase detector subjects any switching of the switching device to a simultaneity of the active edges of the first and second clock signals. This condition of simultaneity enables to avoid that the switching causes the appearance of an unwanted active edge in the signal transmitted to the clock terminal. Besides, as the switching takes place in a single step and quasi instantaneously, an active edge of the second clock signal that would appear a start time after the switching will not run the risk of being ignored during the switching process.

The phase detector may be realized in various forms. Phase detectors are currently used in phase-locked loops inside syntonizers intended for the reception of radio signals. These phase detectors, intended to process analog signals, often have complex structures. In an embodiment that is particularly advantageous because of its simplicity, a smart card reader according to the invention is characterized in that, the phase detector included in the interface module having a first and a second input intended to receive first and second logic signals respectively, and an output intended to deliver a signal that adopts an active state when said first and second signals feature quasi-simultaneous active edges, said phase detector comprising a first and a second memory flip-flop each having a data output, a data input put into the active state and a clock input forming one of the inputs of the phase detector, the data outputs of the first and second memory flip-flops being respectively connected via delay cells to the first and second inputs of a two-input logic AND gate whose output forms the output of the phase detector, which phase detector includes means for putting the data output of the first memory flip-flop into an inactive state when the first input of the logic AND gate is in the active state, while the data output of the second memory flip-flop is in the inactive state, and for putting the data output of the second memory flip-flop into an inactive state when the second input of the logic AND gate is in the active state while the data output of the first memory flip-flop is in the inactive state.

The switching device may also be realized in various forms. In a preferred embodiment of the invention, the interface module of the smart card reader comprises a signal switching device having two signal inputs intended to receive logic signals, a control input intended to receive a control signal and an output intended to deliver either of the two signals received on the signal inputs as a fuinction of the value of the control signal, which switching device is characterized in that it comprises:

a phase detector as described above, whose inputs form the inputs of the device, a multiplexer having two data inputs, each being connected to one of the phase detector inputs, an output forming the output of the device, and a selection input, and a memory flip-flop whose data input forms the control input of the device, whose clock input is connected to the output of the phase detector, and whose data output is connected to the selection input of the multiplexer.

This simple structure of the switching device enables to minimize the silicon surface required for producing the interface module in integrated form, and consequently, to reduce the manufacturing cost of the smart card reader.

As observed earlier, a smart card reader according to the invention may advantageously be used inside a portable telephone. The invention thus also relates to a radiotelephone including a smart card reader in which a smart card, when inserted into the reader, is intended to supply data which are necessary for its operation, characterized in that the smart card reader is of the type described above.

BRIEF DESCRIPTION OF THE DRAWINGS

These and other aspects of the invention are apparent from and will be elucidated with reference to the embodiments described hereinafter.

In the drawings.

DESCRIPTION OF PREFERRED EMBODIMENTS

Figure 1:
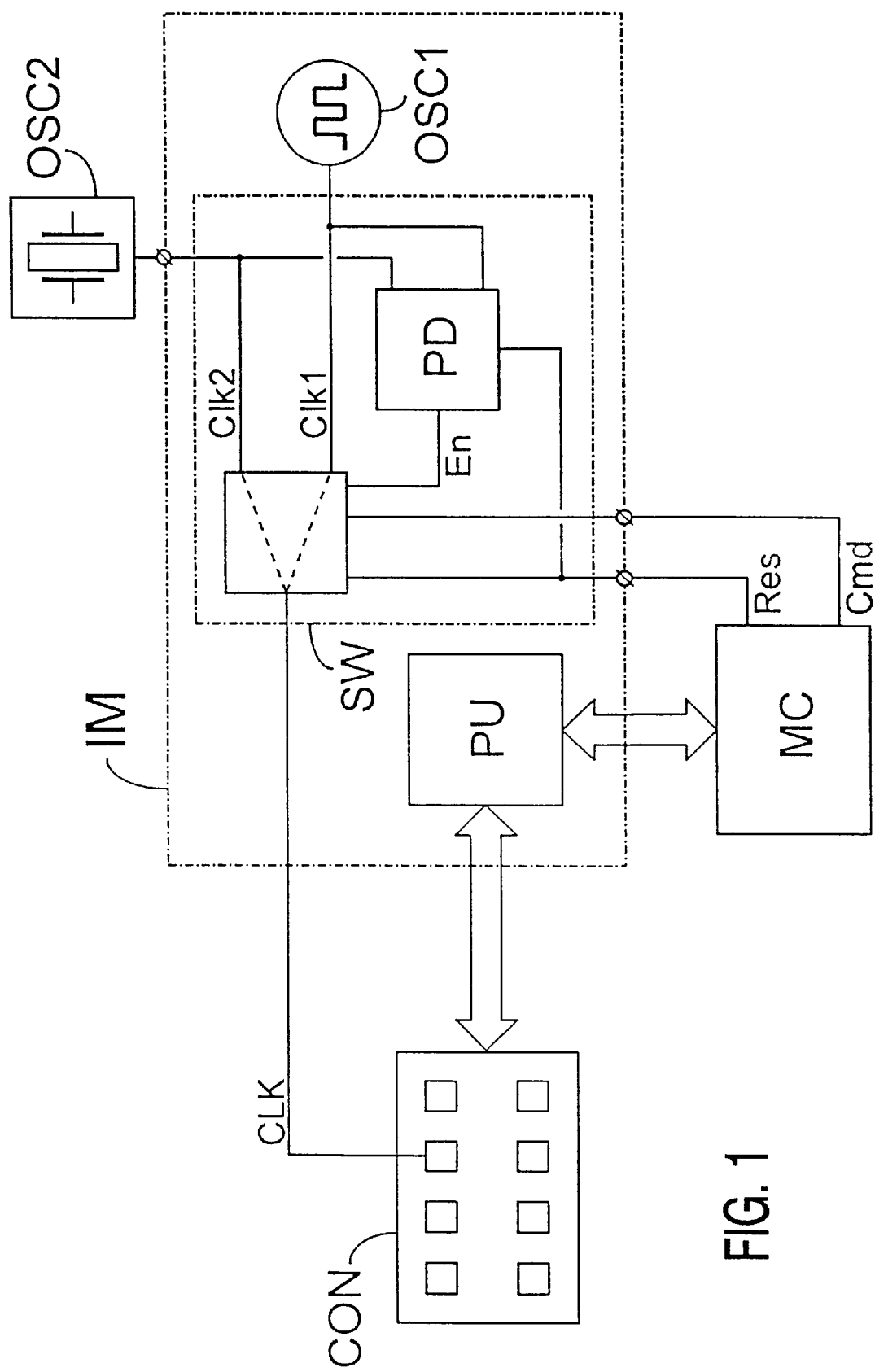
FIG. 1 is a function diagram representing a smart card reader according to the invention.

FIG. 1 diagrammatically shows a smart card reader according to the invention. This reader comprises:

a connector CON intended to be electrically connected to an integrated circuit present on the surface of a smart card inserted into the reader, and of which at least one terminal, called clock terminal, is intended to deliver a clock signal CLK to said integrated circuit, a microcontroller MC intended to exchange data with the integrated circuit and to manage its power supply and its operating frequency, an interface module IM inserted between the connector CON and the microcontroller MC, comprising a first oscillator OSC1, for example, a crystal oscillator either or not followed by a frequency divider, whose output is intended to deliver a first clock signal Clk1 which has a transition frequency, the interface module IM further including a processing unit PU enabling data exchange between the microcontroller MC and the integrated circuit, and a second oscillator OSC2 whose output is intended to deliver a second clock signal Clk2 which has an operational frequency that is higher than the transition frequency.

The interface module IM further includes a switching device SW intended to transport either the first or the second clock signal Clk1, Clk2 to the clock terminal of the connector CON according to the value of a control signal Cmd received from the microcontroller MC.

The switching device SW of the interface module IM comprises a phase detector PD which has an output intended to deliver an authorization signal En that adopts an active state when the first and the second clock signal Clk1 and Clk2 feature quasi-simultaneous active edges, the taking into account of the control signal Cmd by the switching device SW being conditioned by said active state.

The interface module IM has a re-initialization input intended to receive a re-initialization signal Res from the microcontroller MC, the function of which signal is to replace the switching device SW in its initial configuration.

The phase detector PD subjects any switching of the switching device SW to a simultaneity of the active edges of the first and the second clock signal Clk1 and Clk2. In the following of the explanation it will be demonstrated that this condition of simultaneity enables to prevent the switching from causing the appearance of an unwanted active edge in the signal CLK transmitted to the clock terminal.

Figure 2:
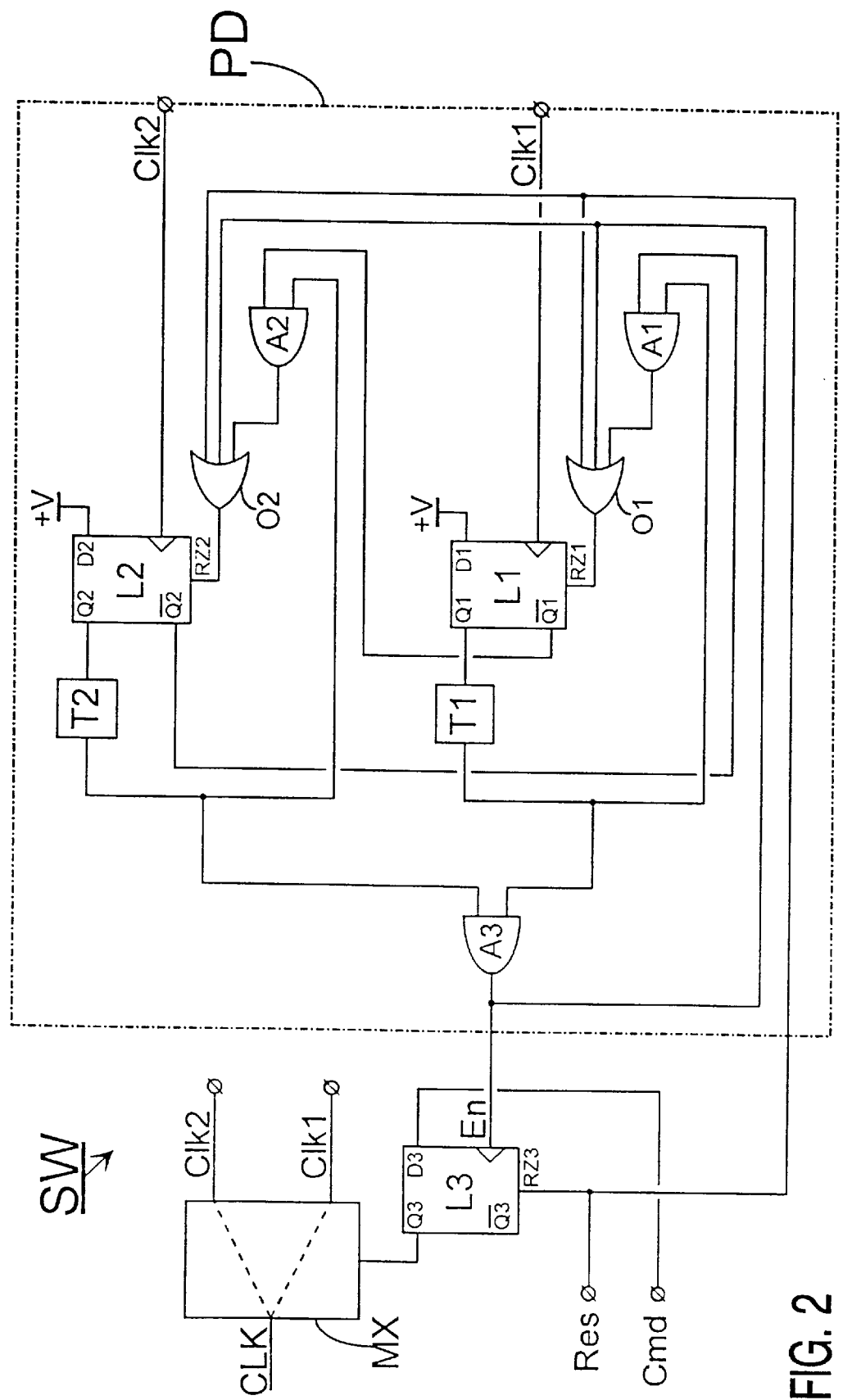
FIG. 2 is an electrical diagram representing a signal switching device included in a smart card reader according to the invention.

FIG. 2 is an electrical diagram representing a preferred embodiment of the switching device SW and of the phase detector PD it contains. The phase detector PD has a first and a second input intended to receive the first and the second clock signal Clk1 and Clk2 respectively, and an output intended to deliver the authorization signal En, which is to adopt an active state when the first and the second clock signal Clk1 and Clk2 feature active edges, i.e. rising edges in this example, which are quasi-simultaneous. The phase detector PD has a first and a second memory flip-flop L1 and L2, each having a data output Q1 and Q2, a data input D1 or D2 put in the active state, i.e., in this example, a logic 1 level materialized by the +V potential of a supply terminal, and a clock input forming one of the inputs of the phase detector PD. In the embodiment described here, each memory flip-flop L1 or L2 further has an inverting output $\overline{Q1}$ or $\overline{Q2}$, and a reset-to-zero input RZ1 or RZ2, which, when put in the active state, i.e., when it receives a logic 1 level, imposes an inactive state, i.e., a logic 0 level in this example, on the data output Q1 or Q2 of said memory flip-flop L1 or L2. This reset-tozero input is connected to an output of a three-input logic OR gate O1 or O2. A first input of this logic OR gate is connected to a re-initialization input of the switching device SW which is intended to receive the re-initialization signal Res. A second input of the logic OR gate O1 or O2 is connected to the output of the phase detector PD. A third input of the logic OR gate O1 or O2 is connected to an output of a two-input logic AND gate A1 or A2. The data outputs Q1 and Q2 of the first and second memory flip-flops L1 and L2 are respectively connected, via delay cells T1 and T2 to the first and second inputs of a two-input logic AND gate A3 whose output forms the output of the phase detector PD. A first input of the logic AND gate A1 or A2, associated to one of the first or second memory flip-flops L1 or L2, is connected to the output of the delay cell T1 or T2 associated to said memory flip-flop L1 or L2. A second input of the logic AND gate A1 or A2, associated to one of the first or second memory flip-flops L1 or L2, is connected to the inverting output $\overline{Q2}$ or $\overline{Q1}$ of the other memory flip-flop L2 or L1.

The switching device SW further includes:

a multiplexer MX having a selection input, two data inputs intended to receive the first and second clock signals Clk1 and Clk2, and an output forming the output of the switching device SW, and intended to deliver the clock signal CLK to the clock terminal of the connector, and a third memory flip-flop L3 whose data input D3 is intended to receive the control signal Cmd, whose clock input is connected to the output of the phase detector PD and whose data output Q3 is connected to the selection input of the multiplexer MX.

The operation of the switching device SW may be described as follows: in an initial state, the data outputs Q1, Q2 and Q3 of the first, second and third memory flip-flops L1, L2 and L3 are in the inactive state. It will be supposed at first that the re-initialization signal Res is in the inactive state. The phase detector PD permanently examines the first and second clock signals Clk1 and Clk2. When, for example, the first clock signal Clk1 features an active edge, i.e., a rising edge here, the data output Q1 or the first memory flip-flop L1 adopts an active state, the inverting output $\overline{Q1}$ simultaneously adopting an inactive state. The reset-to-zero input RZ2 of the second memory flip-flop L2 is then forced to the inactive state via the logic gates A2 and O2, and the data output Q2 of the second memory flip-flop L2 may adopt an active state if the second clock signal Clk2 features an active edge. If, at the end of a delay τ1 introduced by the first delay cell T1, such an active edge has not occurred, the inverting output $\overline{Q2}$ of the second memory flip-flop L2 is still in the active state and the outputs of the logic gates A1 and O1 adopt the active state, thus resetting the data output Q1 of the memory flip-flop L1 to the inactive-state. If, on the other hand, the second clock signal Clk2 features an active edge before the delay τ1 introduced by the first delay cell T1 has elapsed, the inverting output $\overline{Q2}$ of the second memory flip-flop L2 adopts the inactive state and thus prevents the first memory flip-flop L1 from being reset to zero. At the end of a delay τ2 introduced by the second delay cell T2, both inputs of the third logic AND gate A3 are in the active state and the authorization signal En adopts the active state, signaling a quasi-simultaneity of the active edges of the first and the second clock signal.

The duration chosen for the delays τ1 and τ2 introduced by the first and second delay cells T1 and T2 will determine the severity of the criterion of simultaneity. The shorter this duration will be, the closer together the active edges of the first and second clock signals Clk1 and Clk2 will have to be, in order to be considered simultaneous by the phase detector PD.

When the control signal Cmd is in the inactive state, i.e., during the initialization mode, the data output Q3 of the third memory flip-flop L3 is in the inactive state and it is the first clock signal Clk1 that is selected by the multiplanar MX to constitute the clock signal CLK transmitted to the clock terminal of the connector. When the control signal Cmd adopts the active state, thus signaling the entry in permanent mode, the data output Q3 of the third memory flip-flop L3 remains in the inactive state until a quasi-simultaneity of the active edges of the first and the second clock signal Clk1 and Clk2 is detected. The authorization signal En then features an active edge which enables the data output Q3 of the third memory flip-flop L3 to adopt the active state, thus ordering the multiplexer MX to select the second clock signal Clk2 to constitute the clock signal CLK transmitted to the clock terminal of the connector. The data output Q3 of the third memory flip-flop L3 remains in the active state until the re-initialization signal Res adopts the active state. On the other hand, as soon as the authorization signal En adopts the active state, the first and second memory flip-flops L1 and L2 are reset to zero via the logic OR gates O1 and O2 and are ready to detect a new quasi-simultaneity of the active edges of the first and second clock signals Clk1 and Clk2.

Figure 3:
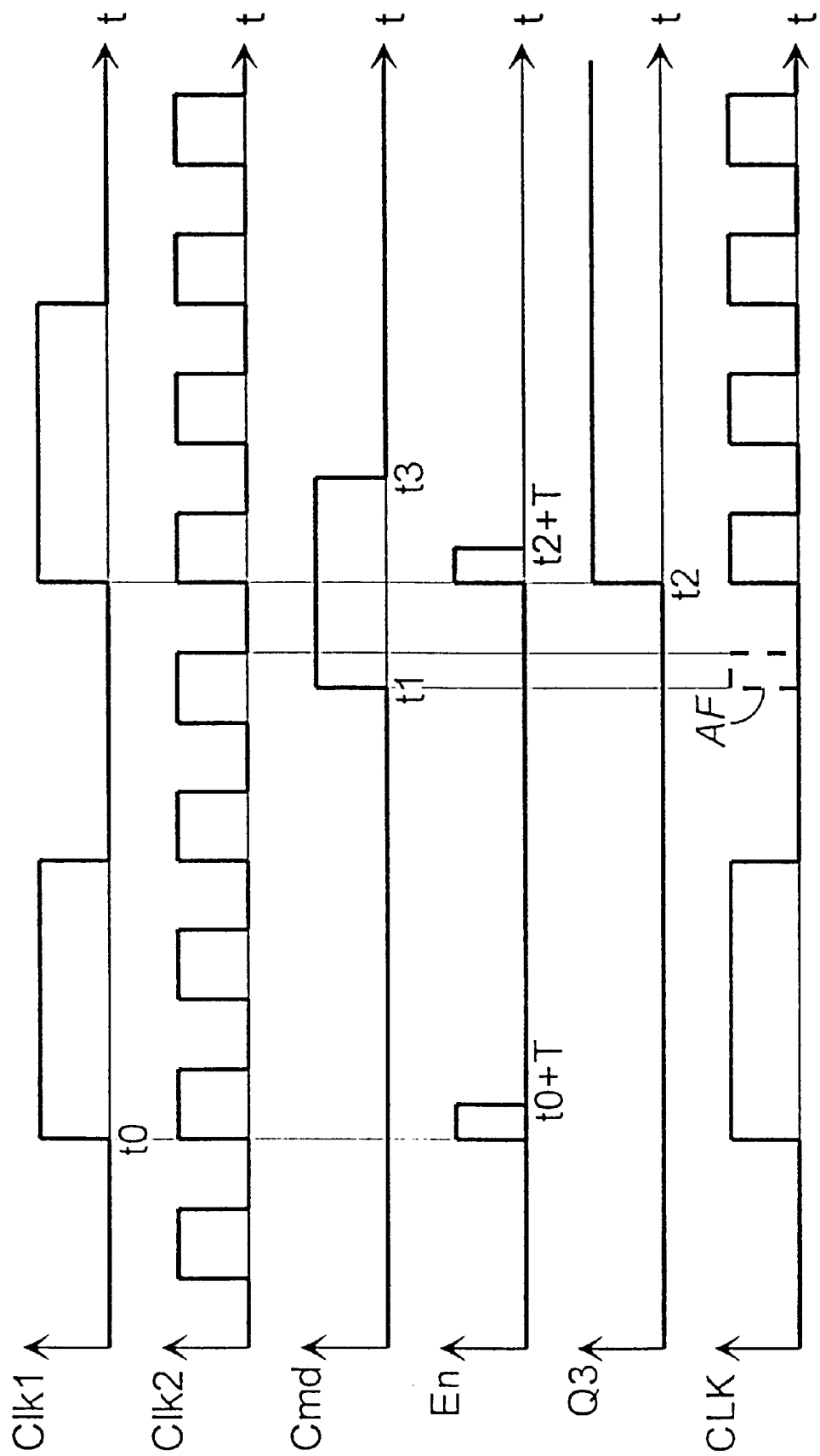
FIG. 3 is a set of timing diagrams representing the evolution of signals present in such a switching device.

FIG. 3 is a set of timing diagrams which illustrates the operation described above and enables to fully grasp the advantages of the invention. The first clock signal Clk1 has a frequency, called transition frequency, which is in this example four times lower than the frequency, called permanent frequency, of the second clock signal Clk2. During the initialization mode, the control signal Cmd is in the inactive state, i.e., at the logic 0 level in this example. The data output Q3 is in the inactive state and it is the first clock signal Clk1 that is selected to constitute the clock signal CLK transmitted to the clock terminal of the connector. At t=t0, the phase detector signals the simultaneity of the active edges, i.e., of the rising edges in this example, of the first and second clock signals Clk1 and Clk2 by putting the authorization signal En into the active state. The active edge of the authorization signal En has no effect on the selection carried out by the switching device, because the control signal Cmd is still inactive. The change of the authorization signal En into the active state resets the memory flip-flops of the phase detector to zero, as explained earlier. The change of the data outputs of said memory flip-flops into the inactive state causes the authorization signal En to return to the inactive state only when t=t0+T, with T=τ+τ' where τ=τ1=τ2 in this example and τ' represents the sum of the other propagation delays of the electric signals in the phase detector. At t=t1, the control signal Cmd adopts the active state, thus signaling the change to the permanent mode. If the switching device were only formed by a multiplexer whose selection input received the control signal Cmd, the second clock signal Clk2 would be selected from the instant t1 onwards to constitute the clock signal CLK transmitted to the clock terminal of the connector. An unwanted active edge AF, represented in dashed lines in the Figure, would thus appear in the signal CLK, which edge would not have been generated by any of the first and second clock signals Clk1 and Clk2. In the switching device in accordance with the invention, the data output Q3 of the third memory flip-flop L3 remains in the inactive state until a quasi-simultaneity of the active edges of the first and second clock signals Clk1 and Clk2 is detected, and it is still the first clock signal Clk1 that constitutes the clock signal CLK. At t=t2, the phase detector signals the simultaneity of the active edges of the first and second clock signals Clk1 and Clk2 by putting the authorization signal En into the active state. The active edge of the authorization signal En enables the data output Q3 of the third memory flip-flop L3 to adopt the active state, thus ordering the multiplexer MX to select the second clock signal Clk2 to constitute the clock signal CLK transmitted to the clock terminal of the connector. The data output Q3 of the third memory flip-flop L3 remains in the active state, stored by said flip-flop until the re-initialization signal Res adopts the active state. At t=t2+T, the authorization signal En comes back to the inactive state and at t=t3 the control signal Cmd also comes back to the inactive state, without any effect on the state of the data output Q3 of the third memory flip-flop.

Figure 4:
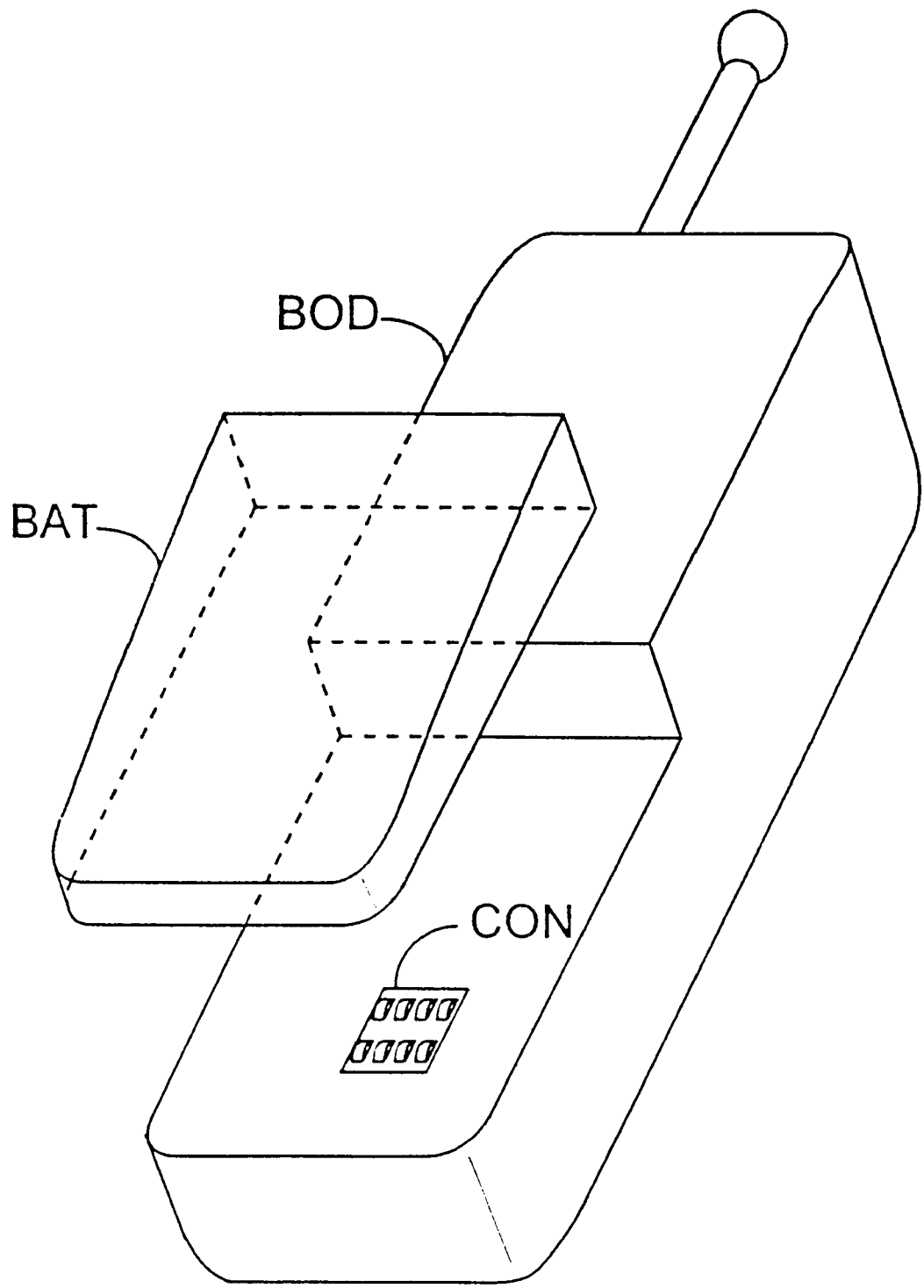
FIG. 4 is a diagrammatic representation of a portable telephone including a smart card reader in an embodiment of the invention.

FIG. 4 represents in a highly diagrammatic manner a radiotelephone including a smart card reader, said smart card being intended, when inserted into the reader, to supply to the telephone data necessary for its operation to the telephone. This telephone comprises a main body BOD and a detachable battery BAT represented in this diagram detached from the body BOD, so as to show a connector CON. This connector CON forms the only visible part of the smart card reader included in the telephone. The connector CON is intended to be connected to an integrated circuit present on the surface of a smart card when the smart card is inserted into the reader. A smart card reader according to the invention enables to reduce the energy consumption of the integrated circuit present on the surface of the smart card during the initialization mode. Such a choice is particularly advantageous in applications where the energy source used for supplying its power to the integrated circuit is a battery, as this is the case for this radiotelephone.

What is claimed is:

1. A smart card reader comprising:
    a connector intended to be electrically connected to an integrated circuit present on the surface of a smart card inserted into the reader, and of which at least one terminal, called clock terminal, is intended to deliver a clock signal to said integrated circuit,
    a microcontroller intended to exchange data with the integrated circuit and to manage its power supply and its operating frequency,
    an interface module inserted between the connector and the microcontroller, comprising a first oscillator, whose output is intended to deliver a first clock signal which has a transition frequency, the interface module further including a processing unit enabling data exchange between the microcontroller and the integrated circuit, and
    a second oscillator whose output is intended to deliver a second clock signal which has an operational frequency that is higher than the transition frequency,
    the interface module further including a switching device intended to transport either the first clock signal or the second clock signal to the clock terminal of the connector according to the value of a control signal received from the microcontroller,
    which smart card reader is characterized in that the switching device of the interface module includes a phase detector which has an output intended to deliver a signal that adopts an active state when the first and the second clock signal feature quasi-simultaneous active edges, the taking into account of the control signal by the switching device being conditioned by said active state.

2. A radiotelephone including a smart card reader, said smart card being intended, when inserted into the reader, to supply to the telephone data necessary for its operation, characterized in that the smart card reader is in accordance with claim 1.

3. A phase detector having a first and a second input intended to receive first and second logic signals respectively, and an output intended to deliver a signal that adopts an active state when said first and second signals feature quasi-simultaneous active edges, which phase detector is characterized in that it comprises a first and a second memory flip-flop each having a data output, a data input put into the active state and a clock input forming one of the inputs of the phase detector, the data outputs of the first and second memory flip-flops being respectively connected via delay cells to the first and second inputs of a two-input logic AND gate whose output forms the output of the phase detector, which phase detector includes means for putting the data output of the first memory flip-flop into an inactive state when the first input of the logic AND gate is in the active state while the data output of the second memory flip-flop is in the inactive state, and for putting the data output of the second memory flip-flop into an inactive state when the second input of the logic AND gate is in the active state which the data output of the first memory flip-flop is in the inactive state.

4. A signal switching device having two signal inputs intended to receive logic signals, a control input intended to receive a control signal and an output intended to deliver either signal received on the signal inputs as a function of the value of the control signal, characterized in that it comprises:
    a phase detector as claimed in claim 3, whose inputs form the inputs of the device,
    a multiplexer having two data inputs, each being connected to one of the phase detector inputs, an output forming the output of the device, and a selection input, and
    a memory flip-flop whose data input forms the control input of the device, whose clock input is connected to the output of the phase detector, and whose data output is connected to the selection input of the multiplexer.

* * * * *